C. F. DAVIS & W. N. PARSONS.
LATHE.
APPLICATION FILED FEB. 7, 1908.

921,807.

Patented May 18, 1909.
5 SHEETS—SHEET 1.

Witnesses
Walter B. Payne
H. H. Simms

Inventors:
Charles F. Davis
William N. Parsons
By
Church & Rich
their Attorneys

C. F. DAVIS & W. N. PARSONS.
LATHE.
APPLICATION FILED FEB. 7, 1908.

921,807.

Patented May 18, 1909.
5 SHEETS—SHEET 2.

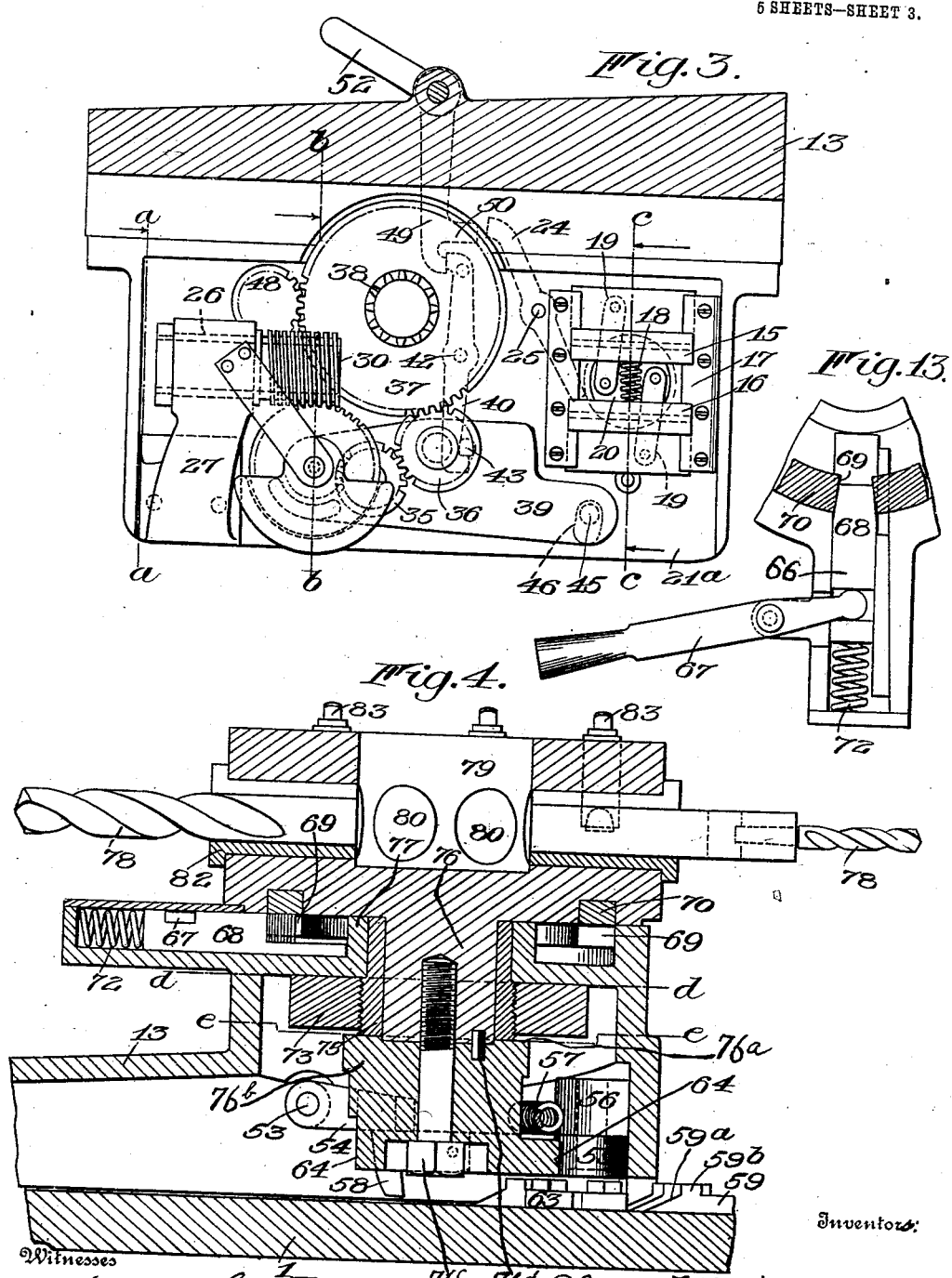

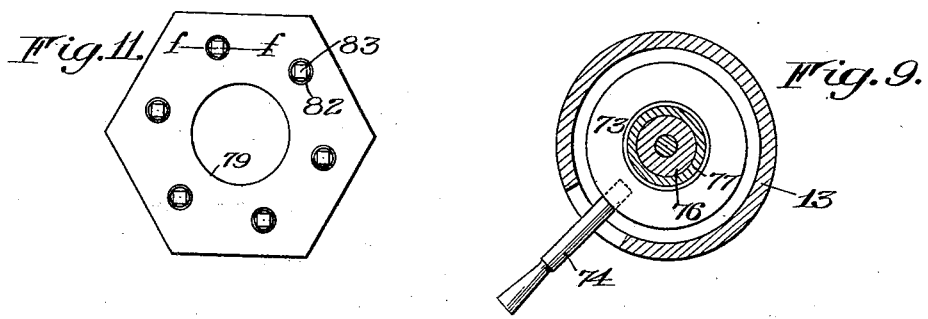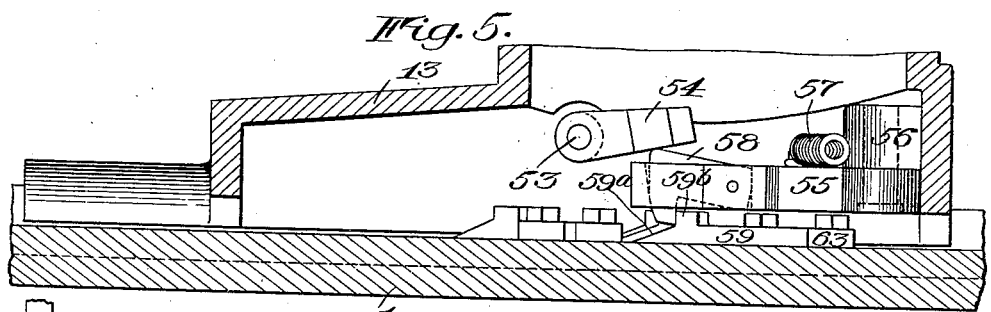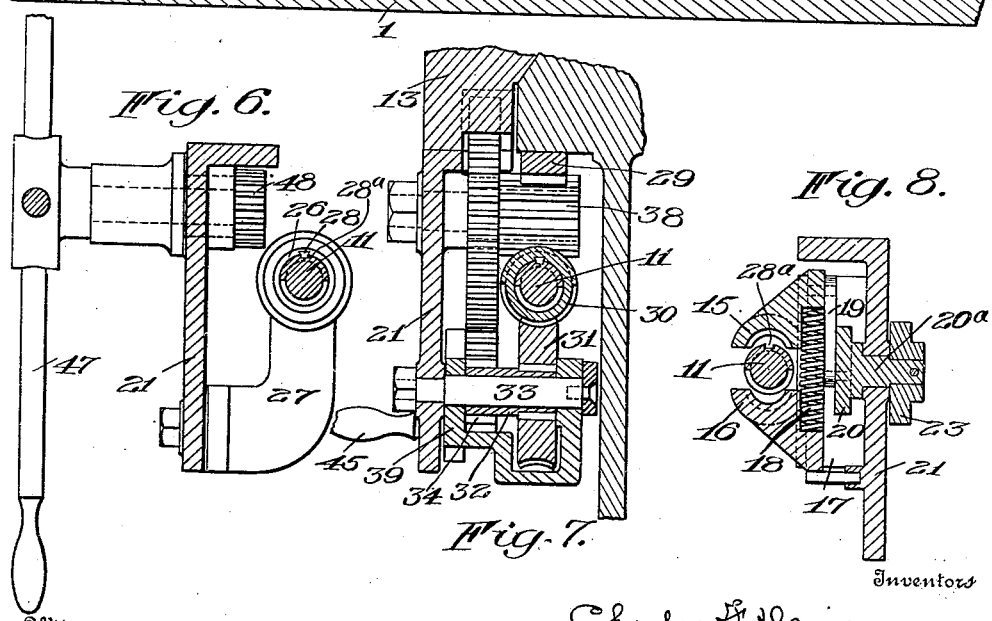

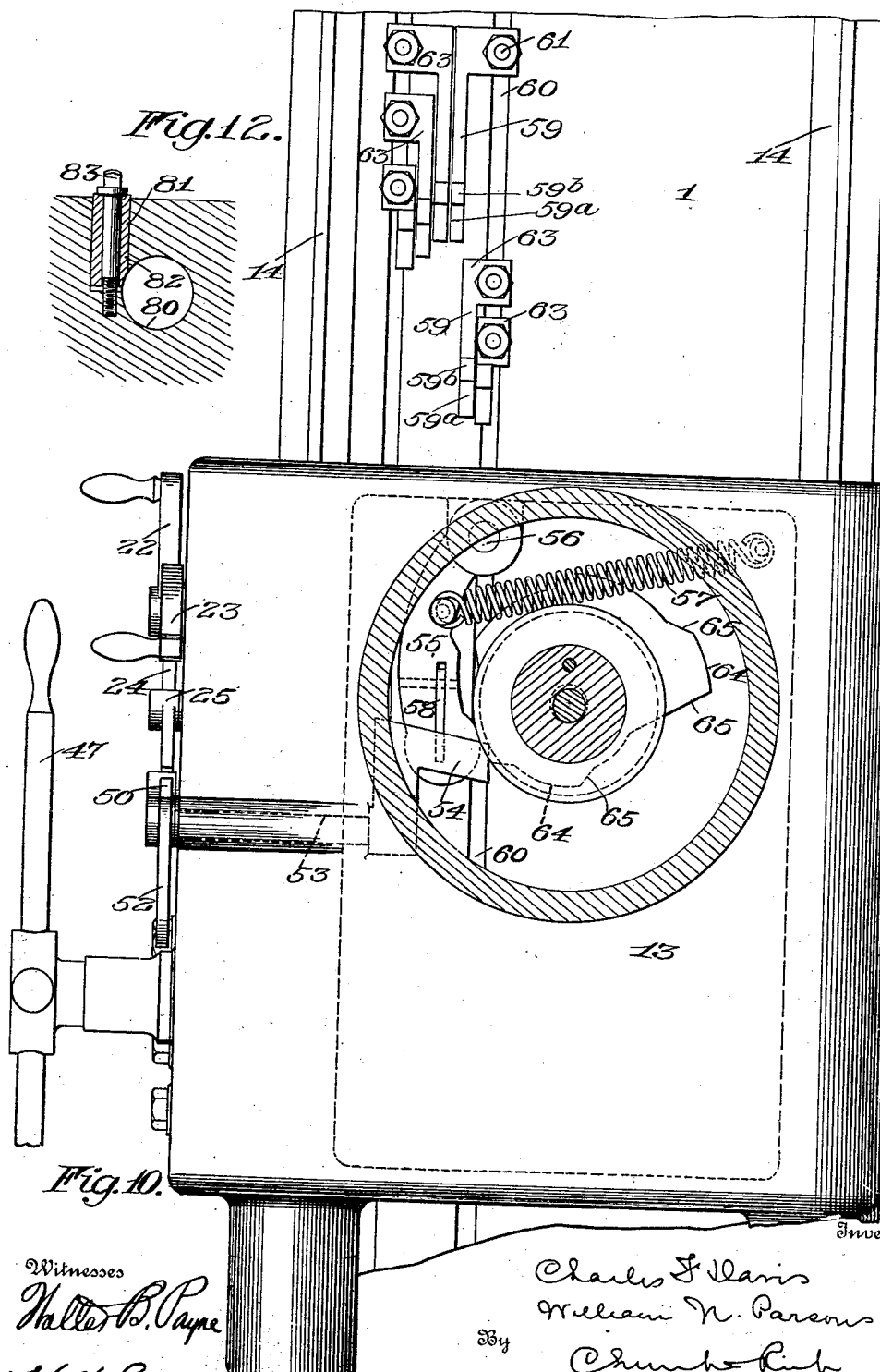

UNITED STATES PATENT OFFICE.

CHARLES F. DAVIS AND WILLIAM N. PARSONS, OF ROCHESTER, NEW YORK, ASSIGNORS TO THE W. P. DAVIS MACHINE CO., OF ROCHESTER, NEW YORK, A CORPORATION OF NEW YORK.

LATHE.

No. 921,807.  Specification of Letters Patent.  Patented May 18, 1909.

Application filed February 7, 1908.  Serial No. 414,684.

*To all whom it may concern:*

Be it known that we, CHARLES F. DAVIS and WILLIAM N. PARSONS, both of Rochester, in the county of Monroe and State of New York, have invented certain new and useful Improvements in Lathes; and we do hereby declare the following to be a full, clear, and exact description of the same, reference being had to the accompanying drawings, forming a part of the specification, and to the reference-numerals marked thereon.

The present invention relates to power lathes and more particularly to those which are provided with devices for automatically effecting the release of the tool-carrying slide from its driving mechanism when the tool has completed a predetermined movement; one object of the invention being to provide two feeding mechanisms for the tool-carrying slide, one for producing screw threads and the other for ordinary work, and another object being to provide an improved means whereby the shifting of a turret on the tool-carrying slide will determine a feeding movement of the tool-carrying slide corresponding with the tool employed.

To these and other ends the invention consists in certain improvements and combinations of parts all as will be hereinafter more fully described, the novel features being pointed out in the claims at the end of the specification.

Figure 1:
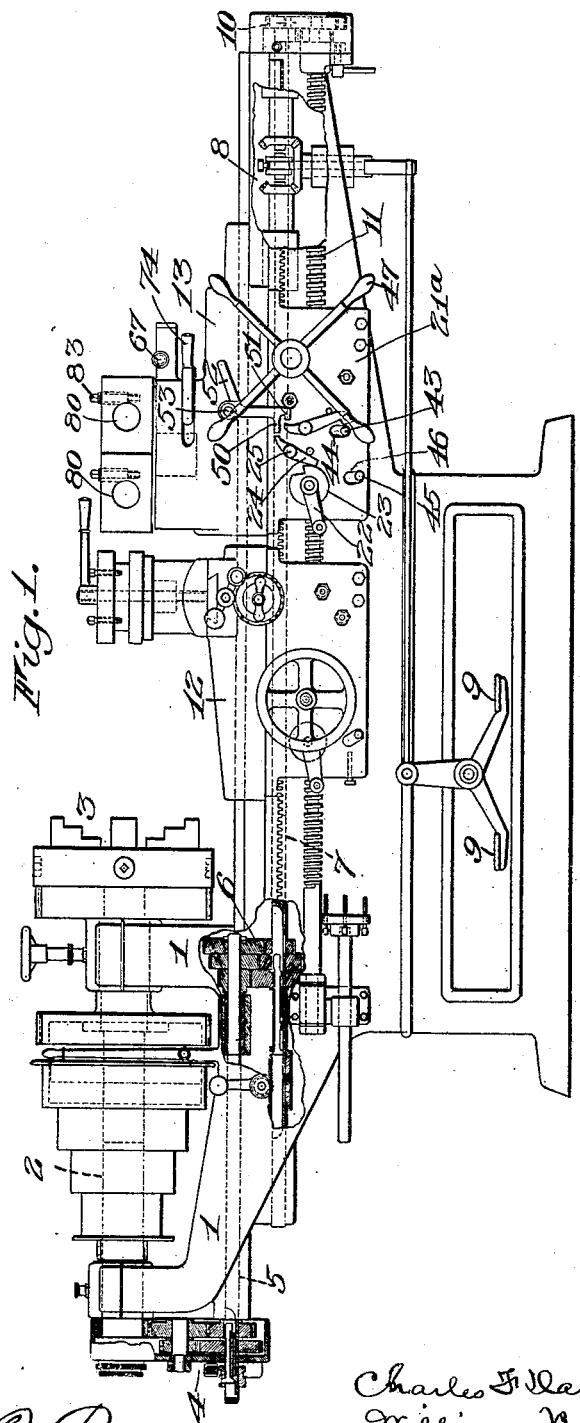
Figure 2:
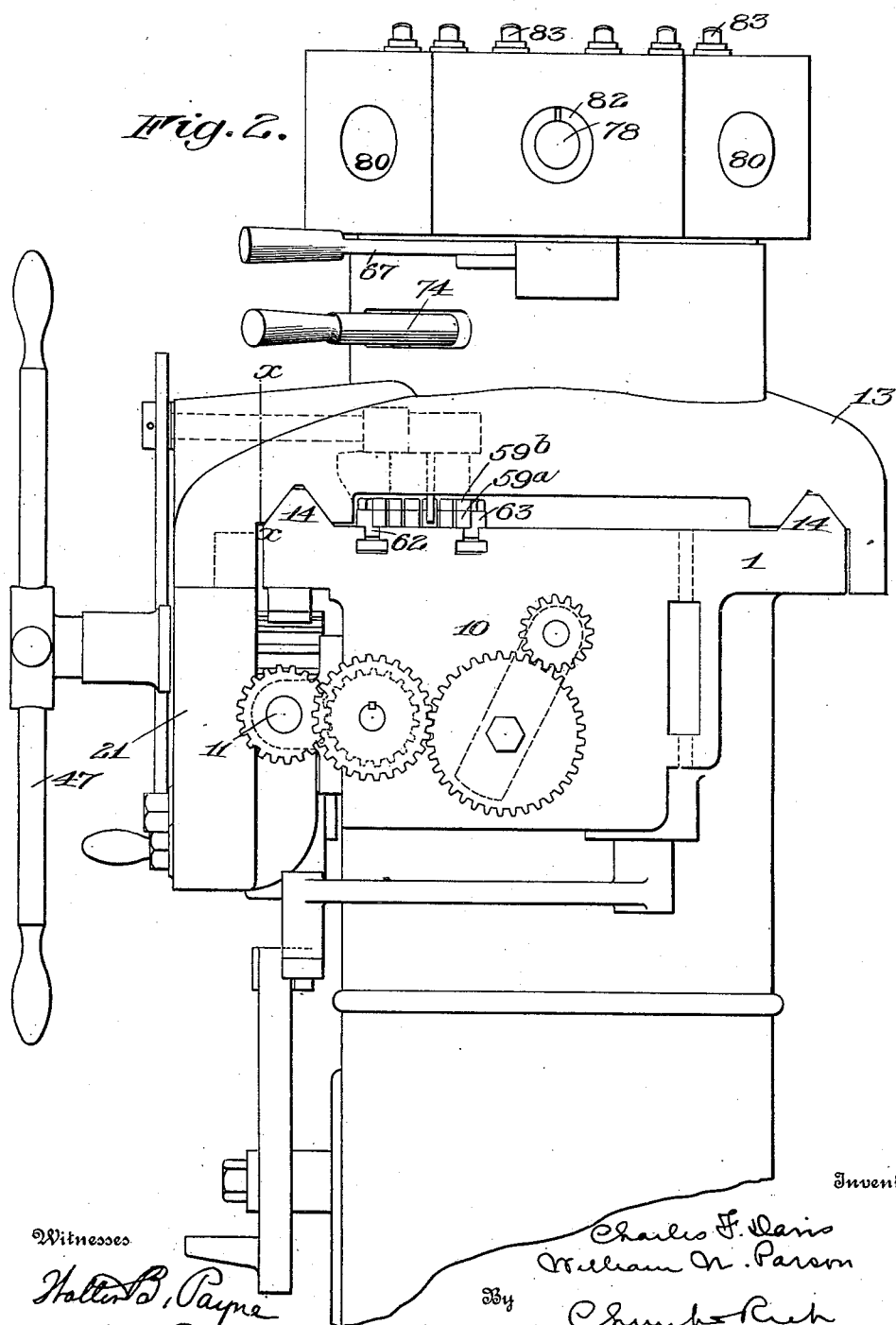

In the drawings: Figure 1 is a side view of a lathe, partly in section, embodying this invention; Fig. 2 represents an end elevation; Fig. 3 is a section on line *x—x* of Fig. 2, showing a view of the inner face of the apron of the turret slide; Fig. 4 is a vertical section through the turret and the turret slide; Fig. 5 is a detail sectional view of the turret slide; Figs. 6, 7 and 8 are sectional views on lines *a—a*, *b—b* and *c—c*, respectively, of Fig. 3; Figs. 9 and 10 are sectional views on lines *d—d* and *e—e*, respectively, of Fig. 4; Figs. 11 and 12 represent, respectively, a top view of the turret and a section on line *f—f* of Fig. 11, and Fig. 13 is a detail sectional view showing a device for locking the turret against rotation.

Similar reference numerals in the several figures indicate similar parts.

The invention is herein shown as embodied in a turret lathe comprising a frame 1 supporting a drive shaft 2 on which is mounted a suitable chuck 3, the drive shaft being connected by a compound gearing 4 to a counter shaft 5 which in turn is connected by variable gearing 6 to a shaft 7 extending longitudinally of the frame 1. The shaft 7 is divided near one end and has a reversing clutch 8 connected to the members thereof, operable by foot pieces 9; while at its extreme end the shaft is geared at 10 to a feed screw 11 arranged on one side of the machine and serving as the driving mechanism for the usual cross feed slide 12 and the turret or tool-carrying slide 13, both of which are movable on longitudinally extending ways or guides 14 on the top of the bed or frame 1.

The feeding of the turret slide which forms one of the features of this invention is accomplished by two mechanisms, one of which is adapted for ordinary work and the other of which is employed when forming screw threads.

The first of the mechanisms embodies preferably a divided nut for engagement with the screw 11, the members 15 and 16 of the nut being guided at their ends on parallel ways 17 and normally held apart by any suitable means, a spring 18 in the present instance effecting their separation. Devices for moving the members into engagement with the feed screw preferably embody a pair of links 19 each pivoted at one end to the nut members and at their other ends eccentrically connected to a disk 20 which is secured to the inner end of a stub shaft 20$^a$ journaled on the apron 21 that depends from the turret slide, the outer end of the stub shaft being provided with a crank arm 22.

A locking device for the operating device of the nut may consist of a notched disk 23 engaged by a dog 24 or latch that is pivoted at 25 to the outer face of the apron and operated in a manner to be described.

The mechanism for feeding the turret slide to cut screws preferably comprises a sleeve 26 journaled on an arm 27 which projects from the inner face of the apron. This sleeve carries on its inner face a feather 28 working in a longitudinally extending slot 28$^a$ in the screw 11, in order that the sleeve may turn with the screw but move longitudinally thereof. Between the sleeve and a rack 29 on the frame or bed is provided a speed reducing gearing preferably embodying a worm 30 on the sleeve 26 meshing with a worm wheel 31 secured to a hollow shaft 32 that is journaled on a stub bearing 33 which projects inwardly from the apron. Also mounted on the hollow shaft 32 is a pinion 34 gearing with a pinion 35 which in turn meshes with a pinion 36 that turns a large gear 37, the latter being also journaled on the apron. A pinion 38 coaxial with the gear 37 gears with the rack 29, and in this manner the rotation of the sleeve effects the advancement of the turret slide on the frame or bed 1.

In order to release the slide from the driving mechanism, the pinions 35 and 36 may be carried on a swinging plate 39 which is journaled on the bearing 33, a latch 40 serving as a means to hold the plate elevated, so that the pinion 36 meshes with the gear 37, and said latch being pivoted on the outside of the apron at 42 and having one end engaging the pin 43 that projects through a slot 44 in the apron. An arm 45 projecting from the plate 39 through a slot 46 in the apron serves as a means by which the plate may be moved manually to effect the meshing of pinion 36 and gear 37, while a hand wheel 47 journaled on the apron and having a pinion 48 on its inner end meshing with the gear 37 serves as a manually operable means for moving the turret slide on the frame or bed when the slide is disconnected from sleeve 26.

Another feature of this invention is the provision of a single device for breaking connection between the turret slide and the feeding shaft. For this purpose the latches 24 and 40 may have their operating portions located in proximity to each other so that a single tripping device may operate them. This tripping device is preferably in the form of a swinging lever 49 having two extensions 50 and 51 for engaging the two latches and an arm 52 by which it may be manually operated. The trip is also adapted to be operated automatically when the turret slide reaches a predetermined position and for this purpose may be secured to a shaft 53 journaled on the turret slide and having at its inner end a crank portion 54. The tripping means, formed in this instance by lever 49, shaft 53 and crank arm 54, is operated at different periods by an operating device and the relative position of the operating device and a plurality of stops 59 may be controlled by the turret in a manner to be described. This operating device preferably comprises a horizontally swinging arm 55 pivoted at 56 to the turret slide and normally held in one position by a coil spring 57, a dog 58 being pivoted on the arm and being movable upwardly to engage the crank to move the trip lever 49.

The movement of the dog 58 may be effected by one of the series of stops 59 preferably arranged on the bed or frame beneath the turret slide, adjustable in ways or inverted T grooves 60 and held in their adjusted positions by T bolts 61 fitting in the grooves, the under surface of the stops being formed with fins 62 fitting in the contracted portions of the grooves to prevent lateral movement of the stops. The forward ends of the stops are beveled at 59$^a$, while shoulders 59$^b$ are formed at the ends of the beveled portions; and in order that a plurality of stops may work on a single way some of them are provided with lateral offset portions 63 to which the bolts 61 are secured. In operation the arm 55 is swung so that the dog 58 will engage the beveled portion of a certain one of the stops 59 when the turret slide nears the end of its movement, thus causing the crank 54 to be engaged by the dog and the shaft 53 to be rotated so that the lever 49 will engage the latch 24 or the latch 40. The engagement of the nose 58$^a$ of the dog with shoulder 59$^b$ effects a positive stop of the turret slide and if the slide comes to a stop before the shoulder is reached the hand wheel 47 may be employed to carry the dog to the shoulder.

As before mentioned, the position of the operating device is controlled by the turret which for this purpose is journaled on the turret slide and carries a plurality of projections 64 extending different distances from the axis of the turret, so that when the ends of the projections engage the arm 55 the latter will be moved about its pivot and carry the dog to a stop 59 corresponding to the projection. The projections are connected by inclined faces 65 so that they form a cam.

The turret slide may be centered in its adjusted position by a suitable device which preferably comprises a slide 66 mounted on the turret slide and movable in a direction radial to the axis of the turret by a manually operable lever 67 so that its beveled end 68 may engage a V shaped notch in a ring 70 depending from the upper enlarged portion 71 of the turret. A spring 72 serves to move the slide 66 normally into engagement with the turret. In order to positively clamp the turret against rotation, we provide the slide with an opening formed by an internal flange 77, the upper face of the flange serving as a friction face at the upper end of the opening, while surrounding the other or lower end of the opening is an externally threaded flange 75 which preferably is formed separately from flange 77 but is rigidly secured thereto, being in this instance carried by a sleeve which is forced into the opening formed by said flange 77. Arranged to turn in the opening in the slide is the reduced or bearing portion 76 of the turret which carries a shoulder 76$^a$ preferably formed on a removable portion 76$^b$ that in this instance carries cam projections 64 and is secured to the bearing portion by a bolt 76$^c$, a pin 76$^d$ acting to prevent relative rotation between the parts. The shoulder 76ª is adapted to be engaged by the ring or nut 73 mounted on the flange 75 (shown disengaged in Fig. 4), in order to draw the turret into engagement with the friction face on the slide, the ring being operable by an arm 74 which projects through a slot in the slide (see Fig. 9). The removal of bolt 76ᶜ permits the portion 76ᵇ to be separated from the turret and the latter to be withdrawn from the slide.

The turret may carry a number of tools 78, in the present instance six being used. It is formed with a central bore 79 to provide a pocket for tools and radial bores 80 intersect the same. The radial bores are in turn intersected by vertical bores 81 in which are arranged clamping sleeves 82 having passed therethrough headed bolts 83 which engage screw threaded sockets at the base of the bores. The tools 78 upon being inserted in bores 80 may be engaged by sleeves 82 upon the tightening of bolts 83, thus being effectively held against movement.

While the operation will be fully understood from the foregoing description, a general statement thereof will now be given: When the machine is employed for the usual run of work the divided nut is thrown into engagement with screw 11 by means of crank arm 22 and the latch 24 engages disk 23. The turret is adjusted so that the operating dog will be positioned to engage one of the stops 59 when the turret slide nears the end of its movement, and this engagement effects the operation of the trip lever 49 to stop the feed of the turret slide. Of course, during this feeding the screw feeding mechanism is not in connection with the feeding screw 11, but when the nut is separated from the latter the screw feeding mechanism may be thrown in by lifting on the arm 45. The latch 40 drops beneath pin 43 by gravity and is engaged by the trip lever 49 in the same manner that latch 24 is engaged.

A lathe constructed in accordance with this invention is adapted for nearly any type of work and as its operations are practically all automatic, exclusive attention is not required by the operator.

We claim as our invention:

1. The combination with a bed and a slide movable thereon, of a pair of feeding mechanisms for the slide each having means normally moving it to inoperative position, a latch for holding each feeding mechanism in operative position, and a single device for operating the latch to cause the feeding mechanism to be thrown out of operation.

2. The combination with a bed and a slide movable thereon, of a feed shaft mounted on the bed, a pair of feeding mechanisms for the slide, operated by the shaft and normally moving to destroy driving connection between the shaft and the slide, latches for retaining said feeding mechanisms in feeding positions, and a single trip for operating both latches.

3. The combination with a bed and a slide movable thereon, of a feed screw mounted on the bed, a divided nut carried by the slide, a latch for holding the members of the nut in engagement with the feed screw, a sleeve secured to the feed screw to turn therewith but to move longitudinally thereof, driving connection between the sleeve and the bed embodying a pinion movable to break the driving connection, a latch for holding the pinion in driving position, and a single trip for operating both latches.

4. The combination with a bed, a slide and a turret carried by the slide, of a pair of feeding mechanisms each adapted to shift the slide, a device for controlling both feeding mechanisms, and a stop for operating said device at a certain position of the slide.

5. The combination with a bed and a slide thereon, of a feeding mechanism for the slide, means for holding the feeding mechanism in operative position, a tripping device for the holding means embodying a crank portion, an operating device for the trip comprising a swinging arm carrying a dog movable to coöperate with the crank portion, a plurality of stops coöperating with the dog for moving it to engage the crank portion, and a turret having means for positioning the arm so that the dog will engage a stop corresponding to the position of the turret.

6. The combination with a bed and a slide thereon, of a feeding mechanism for the slide, a tripping device for the feeding mechanism, an operating device for the tripping device embodying a dog movable to operate a tripping device, and a stop having a beveled portion to coöperate with the dog to effect the movement of the tripping device and a shoulder to be engaged by the dog to limit the movement of the slide.

7. The combination with a bed and a slide thereon, of a feeding mechanism for the slide, a device for controlling the disconnection of the feeding mechanism with the slide, a dog on the slide movable in a horizontal plane and also movable to coöperate with said device to move it, a plurality of stops arranged in a horizontal plane on the top of the bed to engage and move the dog, and a turret on the slide having means controlling the movement of the dog in a horizontal plane to cause said dog to coöperate with one of said stops.

8. The combination with a bed and a slide thereon, of a feeding mechanism for the slide, a device for controlling the disconnection of the feeding mechanism with the slide, a dog on the slide controlling said device, a plurality of stops adjustable in a single way on the bed having offset portions permitting them to be set side by side, and a turret on the slide having means for controlling the position of the dog to cause the latter to coöperate with one of said stops.

9. The combination with a bed and a slide movable thereon, of a feeding mechanism for the slide, a device for controlling the feeding mechanism, an arm pivoted on the slide adjacent to said guide to swing in a horizontal plane, a dog movable on the arm to engage said device, a plurality of stops arranged on the top of the bed in a horizontal plane and engaging the dog to effect the movement of the latter, and a turret on the slide having a plurality of projections of different lengths to engage the arm in order to move the dog horizontally so that said dog may engage with one of the stops.

10. The combination with a bed and a slide thereon, of a feeding mechanism for the slide, a device controlling the feeding mechanism, an arm pivoted on the slide adjacent to said device to swing in a horizontal plane and having a movable dog thereon to engage said device, a plurality of stops arranged on the top of the bed in a horizontal plane to coöperate with a dog to move it, a turret on the slide, and means operated by the turret for moving the dog horizontally so that said dog will engage one of the stops.

11. The combination with a turret slide carrying a stationary bearing member externally threaded near one end and a friction face located near the opposite end of the bearing member, of a turret having a bearing portion projecting into the bearing member and provided with a surrounding shoulder beyond the free end of said bearing member, of greater diameter than the other so as to project beyond the same and coöperating with the free end, and a nut turning on the external threads of the bearing and movable to coöperate with the shoulder on the turret to move the latter into engagement with the friction face of the slide.

12. The combination with a bed and a slide thereon, of a feeding mechanism for the slide, a device controlling the feeding mechanism, a device movable on the slide in proximity to the controlling device and having a movement in a horizontal plane, a movable dog thereon adapted to engage the controlling device, a plurality of stops arranged on the top of the bed in a horizontal plane to coöperate with the dog to move it, and a turret on the slide controlling the horizontal position of the dog carrying device relative to the stops.

13. The combination with a bed and a plurality of stops thereon arranged in a single plane, of a slide movable on the bed, a feeding mechanism for the slide, a device controlling the feeding mechanism, a device mounted on the slide in proximity to the controlling device and having a movement in a plane parallel with the plane of the stops, a movable dog arranged on the last mentioned device, and adapted to engage the controlling device, and a turret on the slide controlling the position of the dog carrying device relative to the stops.

14. The combination with a bed and a slide movable thereon, of a feeding mechanism for the slide, a controlling device for the feeding mechanism, an operating device for said controlling device embodying a dog movable to operate the controlling device, and a stop having a beveled portion on which the dog rides to cause the latter to actuate the controlling device.

CHARLES F. DAVIS.
WILLIAM N. PARSONS.

Witnesses:
RUSSELL B. GRIFFITH,
HAROLD H. SIMMS.